(12) United States Patent
Wu et al.

(10) Patent No.: US 11,094,040 B2
(45) Date of Patent: Aug. 17, 2021

(54) NOISE DETECTION METHOD FOR TIME-SERIES VEGETATION INDEX DERIVED FROM REMOTE SENSING IMAGES

(71) Applicant: Zhejiang University of Technology, Zhejiang (CN)

(72) Inventors: Wei Wu, Zhejiang (CN); Jiancheng Luo, Zhejiang (CN); Ying Shen, Zhejiang (CN); Tingting Chen, Zhejiang (CN); Weiwei Ge, Zhejiang (CN); Zhenqian Chen, Zhejiang (CN); Liegang Xia, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 85 days.

(21) Appl. No.: 16/688,284

(22) Filed: Nov. 19, 2019

(65) Prior Publication Data
US 2021/0027429 A1 Jan. 28, 2021

(30) Foreign Application Priority Data
Jul. 26, 2019 (CN) .......................... 201910680180.5

(51) Int. Cl.
*G06T 5/00* (2006.01)
*G06K 9/00* (2006.01)
(Continued)

(52) U.S. Cl.
CPC .......... *G06T 5/002* (2013.01); *G06K 9/00657* (2013.01); *G06K 9/40* (2013.01);
(Continued)

(58) Field of Classification Search
None
See application file for complete search history.

(56) References Cited

U.S. PATENT DOCUMENTS

2007/0030998 A1* 2/2007 O'Hara .................... G06T 7/174
382/100
2015/0294155 A1* 10/2015 Sant ......................... G06T 7/00
382/195
(Continued)

OTHER PUBLICATIONS

Elavarasan D, Vincent DR, Sharma V, Zomaya AY, Srinivasan K. Forecasting yield by integrating agrarian factors and machine learning models: A survey. Computers and Electronics in Agriculture. Dec. 1, 2018;155:257-82. (Year: 2018).*
(Continued)

*Primary Examiner* — Kim Y Vu
*Assistant Examiner* — Nathan J Bloom
(74) *Attorney, Agent, or Firm* — Muncy, Geissler, Olds & Lowe, P.C.

(57) ABSTRACT

A noise detection method for time-series vegetation index (TSVI) derived from remote sensing images. Firstly, unit root test is used to classify observation values of each pixel into a stationary series or a non-stationary series; for the non-stationary, an appropriate mathematical model is used to model discrete TSVI, then differences between actual observation values and prediction values of the model are calculated and recorded as a deviation. As the deviation has removed seasonal components, the non-stationary series is transformed into a stationary series. For a stationary series or deviation data, noise detection is performed based on the assumption that observation values are distributed within a certain range around mean values; then model fitting and noise detection are iteratively carried out with remained observation values—until the iterations reached the maximum number or no noise is detected at one iteration. The time series is then converted back to image space to obtain a noise mask and optimized. The present invention can obtain an accurate noise mask and improve reliability of land surface-related applications.

1 Claim, 8 Drawing Sheets

(51) Int. Cl.
*G06K 9/40* (2006.01)
*H04N 1/409* (2006.01)

(52) U.S. Cl.
CPC .............. *G06T 5/004* (2013.01); *G06T 5/008* (2013.01); *H04N 1/4092* (2013.01); *G06T 2207/30188* (2013.01)

(56) References Cited

U.S. PATENT DOCUMENTS

| | | | | |
|---|---|---|---|---|
| 2016/0224703 | A1* | 8/2016 | Shriver | G06Q 10/0631 |
| 2017/0250751 | A1* | 8/2017 | Kargieman | G06K 9/46 |
| 2018/0020622 | A1* | 1/2018 | Richt | G06F 16/00 |
| | | | | 703/6 |
| 2018/0348013 | A1* | 12/2018 | Farahmand | G06N 7/005 |
| 2019/0213731 | A1* | 7/2019 | Nefian | G06T 5/002 |
| 2020/0074278 | A1* | 3/2020 | Santhar | G06N 3/084 |
| 2020/0250428 | A1* | 8/2020 | Ahmed | G06K 9/00657 |

OTHER PUBLICATIONS

Hird JN, McDermid GJ. Noise reduction of NDVI time series: An empirical comparison of selected techniques. Remote Sensing of Environment. Jan. 15, 2009;113(1):248-58. (Year: 2009).*
Shao Y, Lunetta RS, Wheeler B, Iiames JS, Campbell JB. An evaluation of time-series smoothing algorithms for land-cover classifications using MODIS-NDVI multi-temporal data. Remote Sensing of Environment. Mar. 1, 2016;174:258-65. (Year: 2016).*
Hmimina, Gabriel, et al. "Evaluation of the potential of MODIS satellite data to predict vegetation phenology in different biomes: An investigation using ground-based NDVI measurements." Remote Sensing of Environment 132 (2013): 145-158. (Year: 2013).*
Vorobiova N, Chernov A. Curve fitting of MODIS NDVI time series in the task of early crops identification by satellite images. Procedia engineering. Jan. 1, 2017;201:184-95. (Year: 2017).*

* cited by examiner

NOISE DETECTION METHOD FOR TIME-SERIES VEGETATION INDEX DERIVED FROM REMOTE SENSING IMAGES

FIELD OF THE INVENTION

The present invention discloses a technology relating to remote sensing image processing, and more particularly, a technology for performing noise detection for time-series vegetation index derived from remote sensing images.

BACKGROUND OF THE INVENTION

Compared with single- or multi-temporal images, time-series remote sensing images can provide information on temporal variations of the earth's surface features, which makes it possible to accurately track the process of the earth's surface evolution. In recent years, with open distribution of medium-resolution images (i.e., TM, ETM+, OLI images obtained by Landsat series satellites and MIS images acquired by Sentinel satellites) and rapid development of computing technologies, usage of all available images to track temporal earth surface evolution has been more widely applied. Multi-temporal and multi-spectral remote sensing images make time series present a high-dimensional space, which brings great difficulties to data analysis and information extraction. Vegetation index can suppress radiation noise and highlight information on vegetation and others to some extent, and time-series vegetation index (TSVI), which has been widely applied to forest monitoring, crop identification, and other applications, can describe temporal variations of vegetation and other features.

During the process of remote sensing imaging, various factors such as clouds, cloud shadows, and bad lines in sensors may cause the sensor's observation values to deviate from the actual values of the earth's surface, resulting in data loss or distortion, that is, noise. Noise will cause errors in the process of information extraction and image classification, thus identifying noise is a prerequisite for proper use of data. Specific to TSVI, noise causes the observation values to present "sudden rise and fall" in a short temporal interval, resulting in the variations of the earth's surface to be concealed. Similarly, the process of marking the contaminated observation values is a prerequisite for proper use of TSVI data to extract the earth's surface information. Therefore, it is important to accurately identify the noise.

Clouds and cloud shadows (hereinafter referred to as C&CS) are the most common noise, and the most current noise detection methods are devoted to C&CS noise detection. The present invention mainly focuses on noise caused by C&CS, but it can also be used for other types of noise. In single-temporal remote sensing images, according to integration mode of prior knowledge, C&CS detection includes two main types: threshold segmentation method and supervised classification method.

Threshold segmentation and its improved approach attempts to separate images into C&CS and their clean observations using one or more thresholds. A typical method is to construct a decision tree through a series of rules in a multi-spectral space to hierarchically segment the image and obtain the C&CS mask. However, in remote sensing images, spectral features of C&CS pixels and clean pixels heavily overlap, resulting in difficulty of separating them by one or more thresholds in the original space. In this regard, projecting the original images into some transformed space can improve distinguishability of cloud/clean pixels and simplify the threshold selection process. However, due to the lack of inherent distinguishability between the cloud and the clean pixels, the threshold segmentation in transformed space remains a balance between false detection and missing detection, therefore the threshold-based method cannot completely solve the problem of differentiating between the cloud pixels and the clean pixels.

The supervised classification method trains a classifier through C&CS samples, and then performs cloud classification with the trained classifier. Resultantly, the C&CS mask is obtained. This method can not only obtain cloud features presented by the samples, but also use a classifier such as support vector machine (SVM) to obtain the non-linear decision space. For the supervised classification method, feature design and classifier selection are two important factors that determine its cloud detection performance. Features such as color and texture; and classifiers such as SVM, shallow neural network, and other machine learning methods or their combinations thereof, have been used for C&CS mask. In recent years, the emerging deep learning-based method integrates feature extraction and classification into a uniform structure, and uses the labeled samples for collaborative optimization to achieve performance better than when using traditional methods.

Although the above-mentioned C&CS mask methods focused on single-temporal images have achieved great success and promoted the development of the earth's surface-related applications, their detection accuracy was far from perfect. Especially, the above methods have difficulty in distinguishing between the thin clouds and high-reflectivity clean pixels. Additionally, in TSVI, the residual thin cloud leads to a "sudden rise and fall" between temporally adjacent vegetation index, which conceals the actual land cover variations and reduces the credibility of the time series application. Due to the increase in the number of images in the time series, the labor and financial consumption of obtaining thin cloud regions through manual interpretation will be even greater. Therefore, it is very important to develop a noise detection method for TSVI.

Conventional noise detection methods mostly assume that the observation values at different time are distributed within a certain range around the mean value (such as the mean plus or minus 2 standard deviations), while the observation values distributed outside this range are regarded as noise. For pseudo-invariant features such as buildings, roads and clean water bodies, their vegetation index does not change with time, and practically the variation of radiometric features in the acquired image are mainly caused by noise factors such as C&CS, so the above methods may be well applied to noise detection of pseudo-invariant features. However, vegetation and various other land cover types, have seasonal characteristics, such as the forest, which grows in spring and leaves in autumn, the vegetation index not only changes with noise such as C&CS, but also has its own temporal characteristics with time, that is, characteristics which are non-stationary, so it is difficult to perform noise detection using the above methods.

SUMMARY OF THE INVENTION

To overcome the above disadvantages of prior arts, the present invention provides a new method for noise detection of TSVI, where the core idea is to separate periodic variation components from the non-stationary TSVI to obtain a deviation, thereby converting it into a stationary series. According to the above idea, the implementation method of the present invention is as follows:

A noise detection method for time-series vegetation index derived from remote sensing images includes the following steps:

Step 1, Time Series Feature Computation;

Assume that a study area consists of n images I acquired at different dates:

$$I=<I_1,I_2,\ldots,I_n> \quad (1)$$

Acquisition date T of each image is expressed as $$T=<t_1,t_2,\ldots,t_n> \quad (2)$$

For the acquisition dates, there is a relationship $t_{i-1} \le t_i$, i=2,3, ..., n, that is, $t_{i-1}$ is prior to $t_i$.

m pixels P in the study area are expressed as:

$$P=\{P^1,P^2,\ldots,P^m\}^T \quad (3)$$

TSVI $X^j$ extracted from time series images I for pixel $(P^j)_{j=1}^m$ is expressed as:

$$X^j=<x_1^j,x_2^j,\ldots,x_n^j> \quad (4)$$

The vegetation index can use the normalized difference vegetation index NDVI, or other vegetation indexes such as the enhanced vegetation index EVI, which is characterized by the fact that the vegetation index can eliminate the radiation background of the surface and highlight the vegetation characteristics.

Step 2, Series Classification;

Determine the temporal variations of TSVI for each pixel, and classify them into a stationary series set S or a non-stationary series set NS, while S and NS satisfy:

$$S \cap NS = \emptyset \quad (5)$$

$$S \cup NS = P \quad (6)$$

where a stationary series refers to a series in which the mean value and standard deviation do not change with time, and a non-stationary series refers to a series in which the mean value and standard deviation change with time. The stationary series test can use a unit root test method, such as the Augmented Dickey-Fuller test (ADF Test) or other classical methods, which are characterized by the fact that each pixel can be classified into a stationary series set or a non-stationary series set.

Step 3, Non-Stationary Series Fitting;

For pixels in the non-stationary series set NS, a mathematical model is used to fit the discrete TSVI. Here, Gaussian model is taken as an example to illustrate its principle.

In the fitting process, T is the independent variable, X is the dependent variable, $\hat{X}$ is the fitting result, and the composite Gaussian model is expressed as:

$$\hat{X}=f(T)=\sum_{k=1}^{K}a_k e^{-\frac{(t-\mu_k)^2}{2(\sigma_k)^2}} \quad (7)$$

where $\alpha_k$, $\mu_k$ and $\sigma_k$ are parameters to be estimated, which describe the Gaussian model; $\alpha_k$ represents the proportion of the Gaussian component k, that is, the proportion of the current component in the total components; K represents the component number in the Gaussian model, that is, the number of peak-and-valley combinations contained by the curve; $\mu_k$ represents the mean value, and when t equals $\mu_k$, the current Gaussian component reaches the maximum value; $\sigma_k$ determines the steepness of the peak.

In this step, Gaussian model and its improved model can be used, such as asymmetric Gaussian model. Other models such as double logistic can also be used, for their shared characteristics is their ability to describe periodic variations in vegetation.

Step 4, Deviation Computation

For the pixel $P^j \in NS$, when $t_i \in T$, the value $\hat{x}_i^{j,1}$ calculated by the model and an actual observed value $x_i^{j,1}$ has been obtained, the deviation $d_i^{j,1}$ can be computed as:

$$d_i^{j,1}=\hat{x}_i^{j,1}-x_i^{j,1} \quad (8)$$

Its superscript 1 indicates that the first iteration $d_i^{j,1}$ indicates the closeness of the calculated value $\hat{x}_i^{j,1}$ to the actual observed value $x_i^{j,1}$. The larger the $|d_i^{j,1}|$, the greater the difference between the two, and therefore the worse the fitting result will be. Conversely, the smaller the $|d_i^{j,1}|$, the closer the two, and therefore the better the fitting result will be.

For the pixel $P^j \in P$ where $t_i \in T$, the result of deviation computation from the first iteration is expressed as:

$$D^{j,1}=<d_1^{j,1},d_2^{j,1},\ldots,d_n^{j,1}> \quad (9)$$

As the deviation $D^{j,1}$ removes seasonal components, the non-stationary series is converted into a stationary series.

Step 5, Noise Detection;

For the converted deviation series $D^{j-1}$ and stationary series S, noise detection is performed based on the assumption that observed values are distributed within a certain range around the mean.

For $P^j \in S$, the original series $X^j$ is used for noise detection, whereas for $P^j \in NS$, the deviation series $D^{j,1}$ is used. For the convenience of description, the original series and the deviation series are written as $s^j$ uniformly:

$$s^j=<s_1^j,s_2^j,\ldots,s_n^j> \quad (10)$$

Then noise is detected by the following method, where $m_i^j$ is mask data, indicating whether the pixel $P^j \in P$ at $t_i \in T$ is a valid observation as indicated by 1, or is noise as indicated by 0.

$$m_i^j = \begin{cases} 1 & s_i^j \ge [\mu(s^j)-\lambda\sigma(s^j)] \text{ and } s_i^j \le [\mu(s^j)+\lambda\sigma(s^j)] \\ 0 & \text{otherwise} \end{cases} \quad (11)$$

where $\mu(s^j)$ represents the mean of $s^j$, $\sigma(s^j)$ represents the standard deviation of $s^j$, and $\lambda$ represents a multiple of the standard deviation. The significance of the algorithm is that an observation value, whose distance from the fitting curve is distributed within the range of the mean value plus or minus $\lambda$ standard deviations, is taken as a valid observation, while an observation distributed outside of that range is taken as noise. Through the above process, the mask $M^j$ of the pixel $P^j \in P$ can be obtained.

$$M^j=<m_1^j,m_2^j,\ldots,m_n^j> \quad (12)$$

Step 6, Iteration Process;

For the remaining observation values after noise removal, that is, excluding the observation with $m_i^j=0$, the step of non-stationary series fitting (step 3), deviation computation (step 4), and noise detection (step 5) are repeated until the iteration reaches the maximum number or no noise is detected in one iteration.

Step 7, Noise Mask;

The mask data of each pixel $P^j \in P$ is converted back to the image space to obtain the noise mask M.

$$M=<M_1,M_2,\ldots,M_n> \quad (13)$$

where $M_i \in M$ indicates whether each observation in the image $I_i \in I$ is a valid observation value or not. In subsequent applications, noise needs to be eliminated to obtain accurate application results.

Step 8, Mask Optimization;

The noise is optimized according to mathematical morphology method, for example, removing isolated salt-and-pepper noise and isolated valid data points in the large cloud noise, to obtain a smooth mask result.

In the present invention, firstly, a series is classified into a stationary series or a non-stationary series. Then, the deviation is obtained by removing seasonal components of a non-stationary TSVI, where the deviation may be regarded as a stationary series following the Gaussian normal distribution. As most valid observation values are distributed within a certain range around the mean value, the noise may therefore be identified as an observation value located away from the mean value.

Advantages of the present invention: this method can obtain accurate noise masks and improve the reliability of earth's surface-related applications.

BRIEF DESCRIPTION OF THE DRAWINGS

FIG. 2A~FIG. 2D are curves of the normalized difference vegetation index (NDVI) variations with time for the four typical surface features aforementioned. Here, FIG. 2A represents building, FIG. 2B represents water body, FIG. 2F represents forest and FIG. 2D represents farmland.

FIG. 4A is the fitting result of the original TSVI; FIG. 4B is the deviation and the noise detection result of the first iteration; FIG. 4C is the fitting result of the time series after noise removal; FIG. 4D is the fitting process of the TSVI and its noise detection results.

SPECIFIC EMBODIMENT

Figure 1:
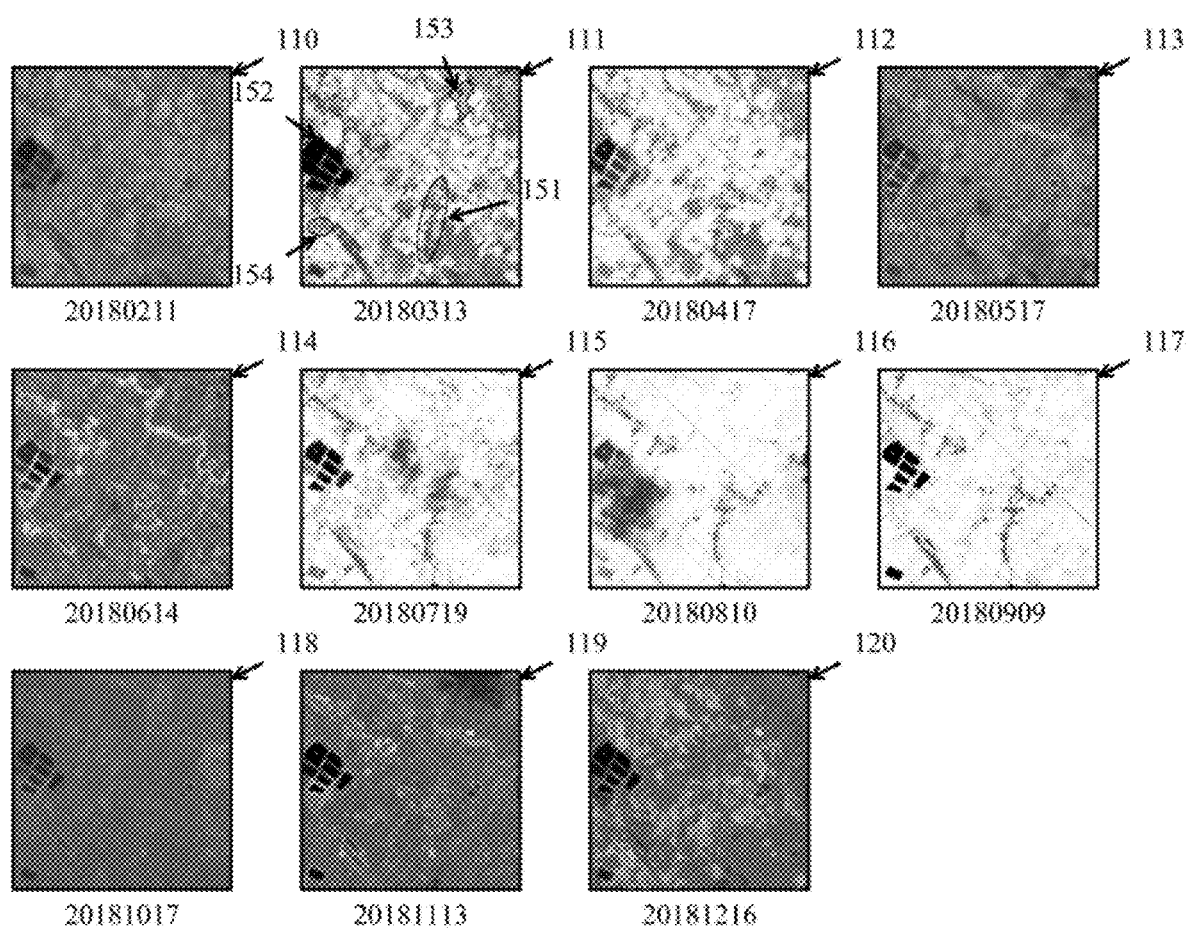
FIG. 1 is a schematic diagram of time-series images of a study area. Land cover types in the study area include building, water body, forest, farmland, and so on, and some areas of the image are contaminated by thick or thin clouds which obscure the actual earth's surface conditions.
Figure 2:
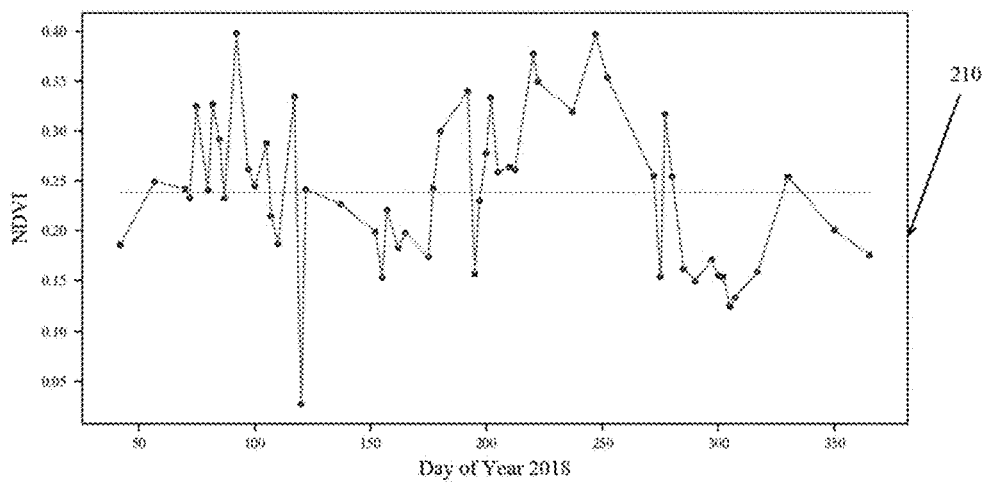
Figure 2:
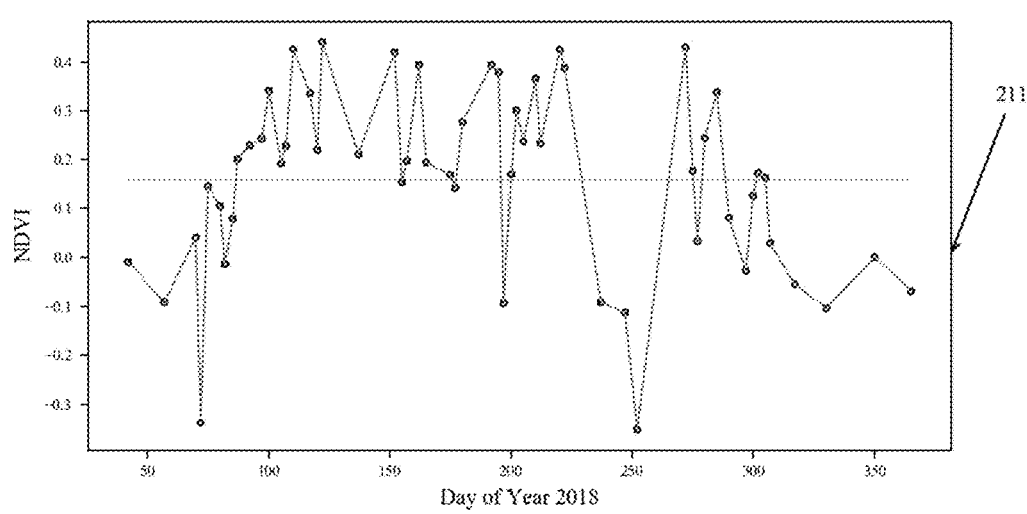
Figure 2:
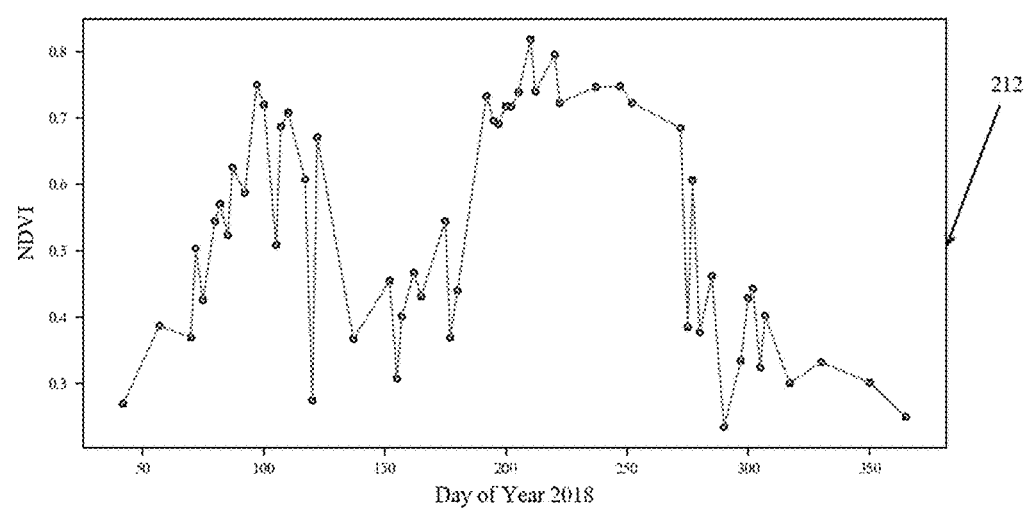
Figure 2:
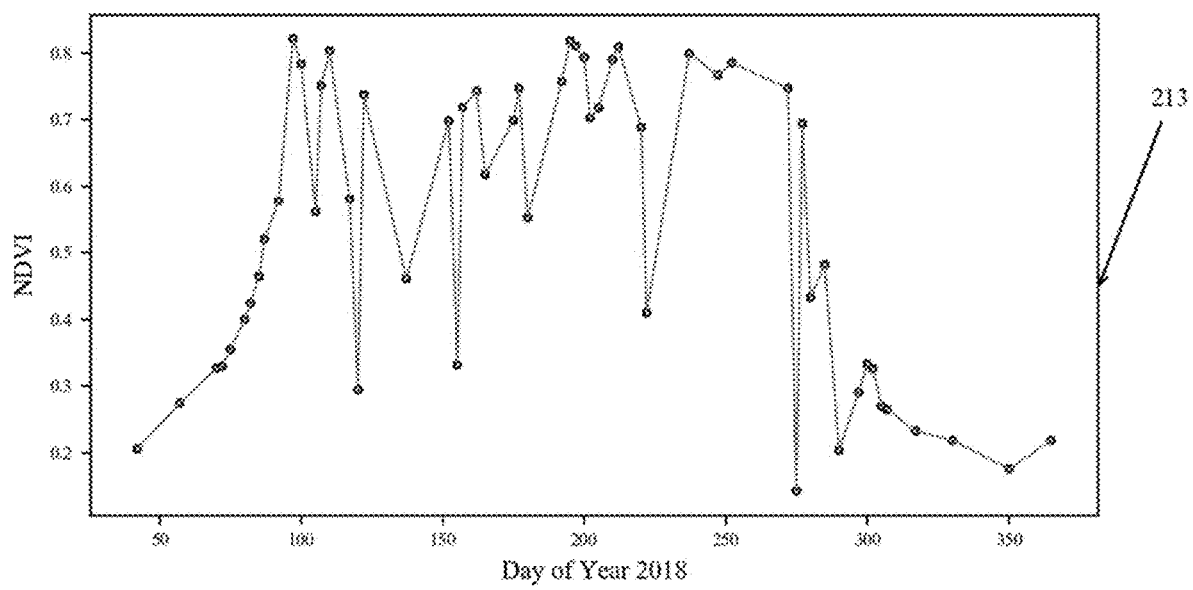

The embodiments of the present invention provide a noise detection method for TSVI from remote sensing images, and the implementation details are as follows:

FIG. 1 shows the NDVI time-series image of the same study area on different dates, where the color changes from gray to black indicates that the NDVI value is gradually decreasing. NDVI can be obtained by the same or different sensors, or even be acquired from different platforms through image preprocessing. The NDVI shown in FIG. 1 is obtained by the images acquired from a multispectral imager (MSI) on Sentinel-2A and Sentinel-2B satellites. Images acquired by other satellites or sensors may also be used to construct time series. If the spatial resolution of the original time-series image is different, the images need to be resampled to the same resolution.

FIG. 1 is only one part of the time-series images of the study area. There are a total of 115 images covering a part of or the whole study area in the data distribution website, and here only one image from each month is selected for illustration. The number of images is unconstrained, for more images and shorter time intervals will provide richer evolution information of the earth's surface, thereby improving the accuracy of the fit. In addition, we recommend having the temporal span cover one year or longer so that the time-series images contain one or more complete vegetation and crop growth cycles, but this is not mandatory, for more images which cover the complete vegetation cycle will improve noise detection performance.

For pixel-wise time-series analysis, images must undergo rigorous geometric correction and reach sub-pixel accuracy. In addition, radiometric-correction should be performed for every image to remove sensor- and atmosphere-related noise and convert it to the top/bottom of atmosphere reflectance (TOA/BOA), which will improve consistency between images acquired on different dates. As an alternative, radiometric normalization can be used instead for image radiometric processing to eliminate radiation differences between images at different times, enabling them to have similar radiation acquisition conditions.

From the time-series images, we can observe that (1) on image 111, the NDVI value of building 151 acquired at different times remained relatively stable with little change; (2) the NDVI value of water body 152 was low throughout the year with little change; (3) farmland 153 had two peaks, where one peak appeared in March (corresponding to image 111) and April (corresponding to image 112), while the other peak appeared in August (corresponding to image 116) and September (corresponding to image 118); (4) after forest 154 grew in May, it remained vigorous until September, and then gradually decreased.

We can observe the evolution pattern of land cover by simultaneously observing multi-temporal images; however, since time-series images are high-dimensional, it is not intuitive to visually analyze multiple images simultaneously, since it is a labor-intensive work. Extracting well-defined features from time-series images and constructing feature vectors will simplify the process. For example, the normalized difference vegetation index NDVI and the enhanced vegetation index EVI can not only highlight the difference between the vegetation and the background, but can also reduce the dimension of multi-spectral images. Therefore, TSVI provides a convenient and effective index for dynamic variation analysis of land cover.

According to the temporal evolution pattern, there are four main types of land cover in the study area, namely building, water, forest, and farmland. FIGS. 2A-D show temporal variation of NDVI of the above land cover types respectively. The main characteristics are summarized as follows: (1) in theory, the NDVI of the building does not change with time, and it is usually called a pseudo-invariant feature. The change of the NDVI can be attributed to non-surface related factors, and this characteristic has been widely used for radiometric normalization. (2) The NDVI variation of the water surface is not only affected by the radiation characteristic of the water itself, but also by the content of chlorophyll and sediment, thus the variation is difficult to represent and describe using a predetermined model. (3) Farmland is a type of land cover under the control of farming activities, and the peak time of the NDVI may deviate from the peak time of the natural vegetation. In addition, due to the influence of planting multiple crops in the same plot in a year, many pairs of peaks and valleys can be found in its time trajectory. (4) Forests have seasonal variations, such as spring growth and autumn decline. Consistent with this rule, the NDVI grows in spring, peaks in summer, and then falls in autumn.

According to the above time curve, it can be seen that the farmland and forest pixels contain periodic variations of vegetation, and it is difficult to detect noise based on the assumption that the noise deviates far from the mean value. Fortunately, studies have shown that the NDVI variations caused by vegetation growth and fading can be better simulated using a mathematical model. Inspired by this mechanism, we can remove the seasonal components from the TSVI of forests, crops, etc., convert a non-stationary series into a stationary series, and then implement noise detection.

Figure 3:
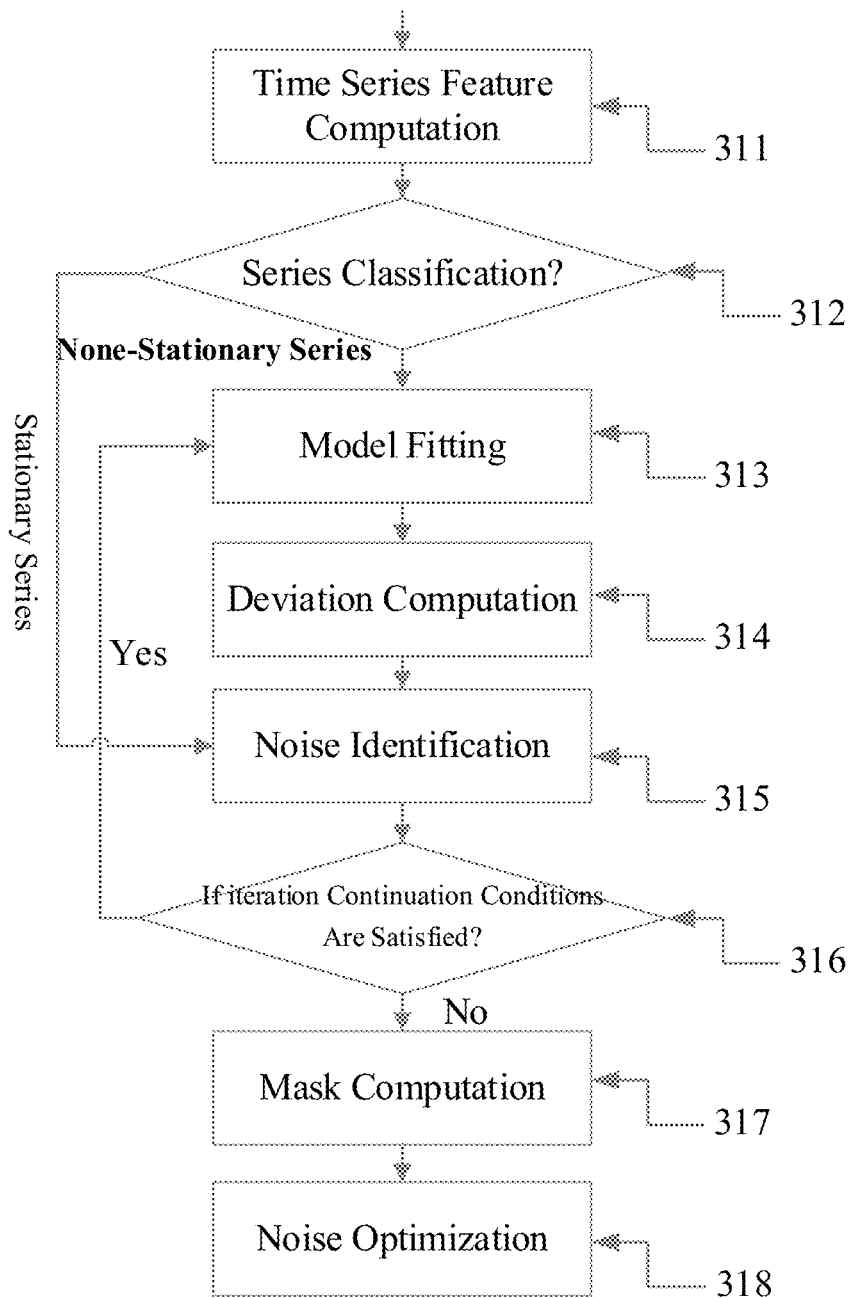
FIG. 3 is a flow chart of noise detection of the present invention.
Figure 4:
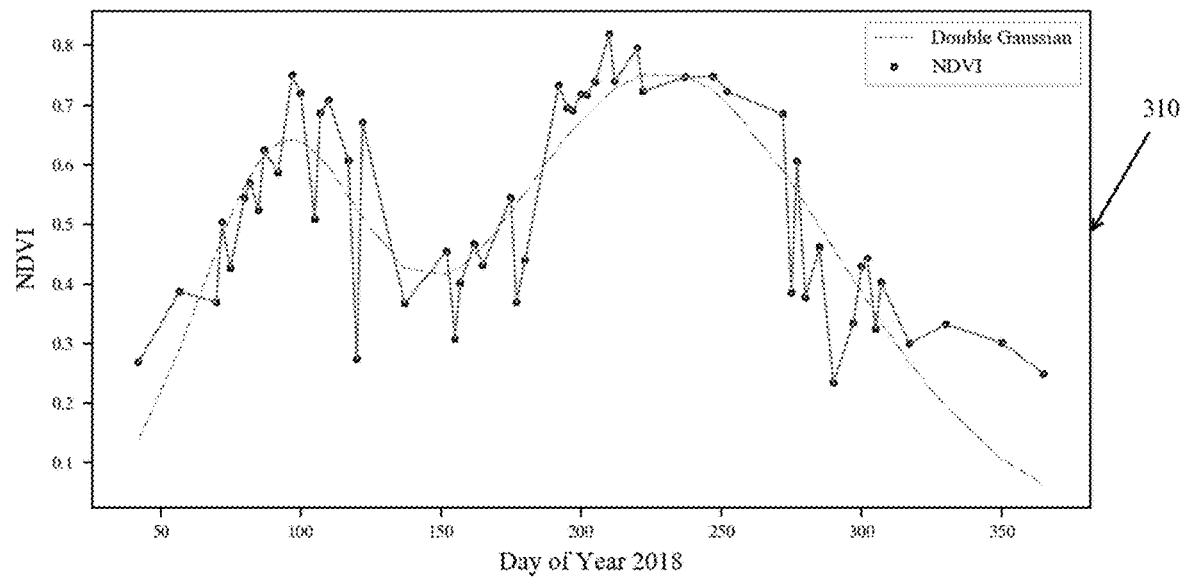
FIG. 4A~4D are iterative processes of the noise detection.
Figure 4:
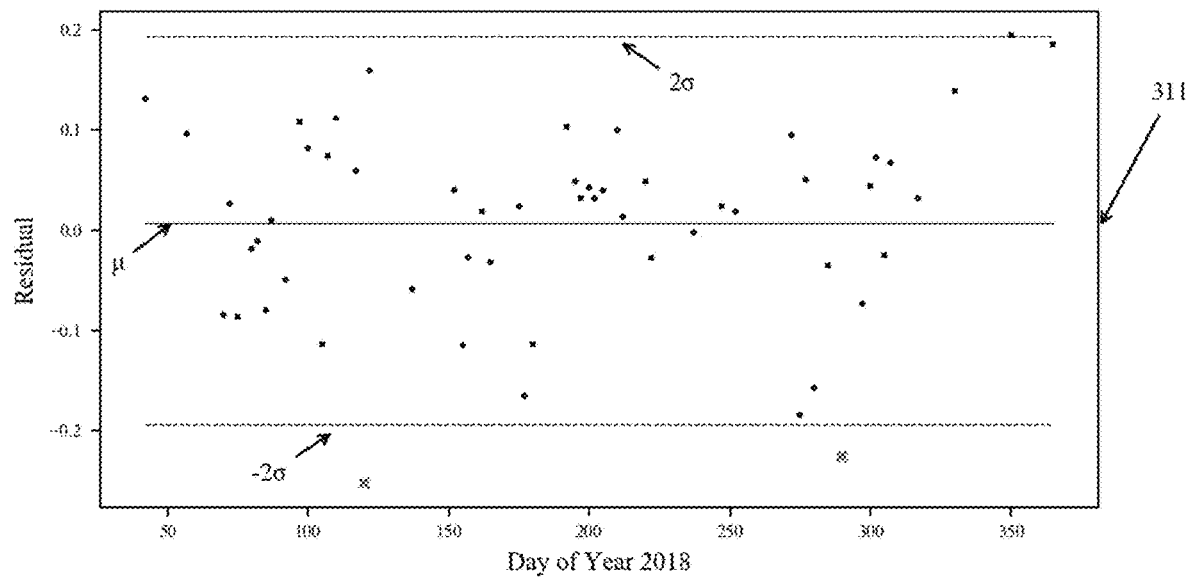
Figure 4:
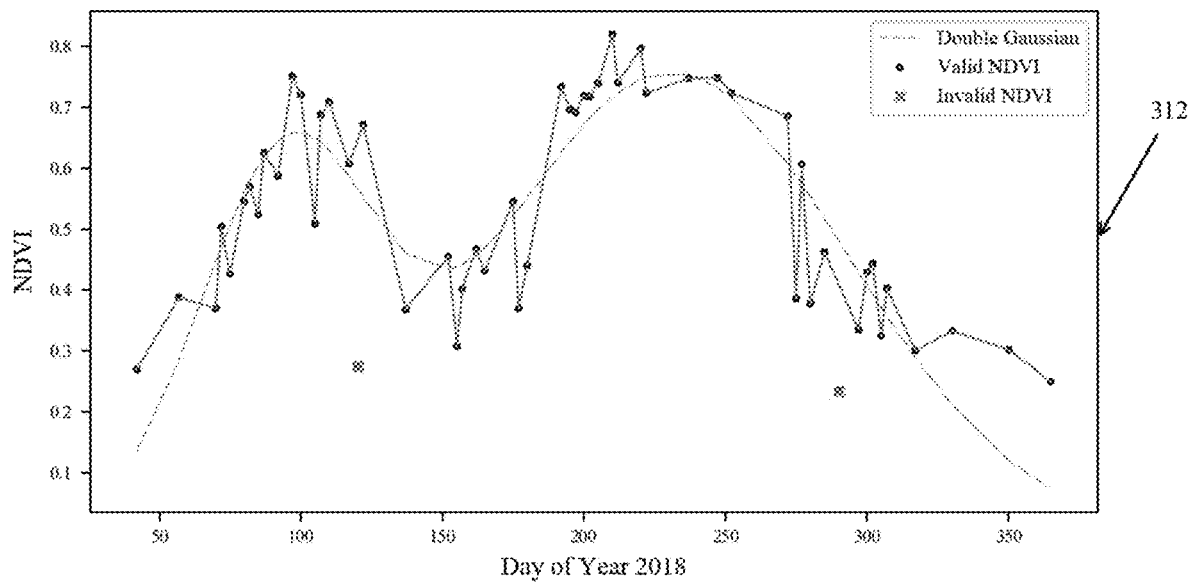
Figure 4:
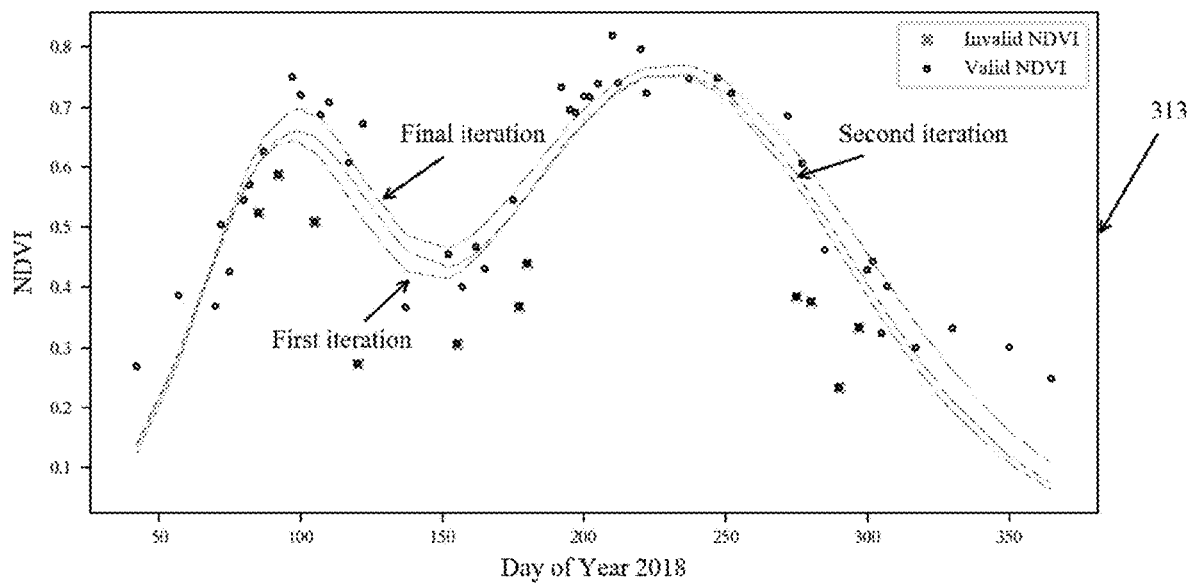

FIG. 3 is a flow chart showing the method disclosed in the embodiment, and FIG. 4 shows the result achieved by the implementation of the present invention. The present invention divides the implementation method into eight steps, and the embodiment of the present invention is described in detail in conjunction with FIG. 4.

Step 311: Time Series Feature Computation

In this step, the vegetation index is computed from time-series images $I=<I_1, I_2, \ldots, I_n>$ pixel by pixel $(P_j)_{j=1}^m$. From it, the computation method of NDVI is:

$$NDVI = \frac{NIR - R}{NIR + R} \quad (14)$$

where NIR and R represent the observation value in the near-infrared band and the red band, respectively, and are expressed by spectral reflectance or Digital Number (DN) values. According to this, feature vectors $X^j=<x_1^j, x_2^j, \ldots, x_n^j>$ of each pixel are constructed, where $x_i^j \in X^j$ indicates NDVI at $t_j \in T$, and $X^j$ describes temporal variation of pixel $P^j \in P$. However, the values of $x_i^j \in X^j$ contain distortion caused by noise, and need to be detected by the method of the present invention.

FIG. 4A shows temporal variation of NDVI of a farmland pixel.

Step 312: Series Classification;

The goal of the present invention is not to classify land cover as a land type with a definite geographical significance, but to test stationarity of time series, and then convert the non-stationary series into the stationary series for noise detection. In mathematics, a stationary series means that the mean and standard deviation of the series do not change with time. In TSVI, land cover of the building and clear water which have no obvious seasonal variation can be regarded as a stationary series. Taking vegetation as a representative, its pixels have obvious periodic variations; its TSVI is a non-stationary series.

A unit root test is used to detect whether a series is stationary. If a series has a unit root, it is non-stationary, otherwise the series is stationary. There are some stationary series testing techniques, such as ADF test, Daniel Test. In disclosure of this embodiment, we use ADF test to check if a series is stationary. Confidence parameters are required to indicate credibility of results, and the parameters can be adjusted as needed.

Other existing unit root test techniques can be used in place of the technology in this step, for the goal is to accurately classify a series as stationary series or non-stationary series.

If a series is non-stationary, we will perform noise detection through 313, 314, and 315. Conversely, if a series is stationary, we can skip the two steps of model fitting 313 and deviation computation 314, and directly proceed to performing noise detection 315.

As shown in FIG. 4A, a crop pixel NDVI curve with time has obvious periodic variations, which will be determined to be a non-stationary series according to this step.

Step 313: Model Fitting;

This step uses a definite mathematical model to fit discrete TSVI. The mathematical model used can be asymmetric Gaussian, nonlinear Fourier, double logistic, etc. The selectable mathematical models are characterized by their capability of describing vegetation variation as accurately as possible to reduce error of model fitting. The Gaussian model is used in this embodiment.

Since there may be multiple pairs of peaks and valleys in time series of crops, a multi-peak model is used in this embodiment, and the number of the peak-and-valley pairs K needs to be determined: we set K=1, 2, . . . 3 respectively, and select K with the smallest fitting deviation as the parameter.

Model parameters estimation can use an analytical method (such as least square method), a heuristic method (such as stochastic gradient descent method), or an optimization method. This parameter can also be adjusted as needed.

FIG. 4A shows the results of the time series fitting. It can be seen that the method of the present invention can obtain the time series fitting results effectively.

Step 314: Deviation Computation;

Through model fitting 313, we can obtain the predictive value $\hat{x}_i^j$ of pixel $P^j \in P$ at $t_i \in T$, where the difference value $\hat{x}_i - x_i$ represents the fitting degree of the model fitting value and the curve. Deviation $D^{j-1}$ of $P^j \in P$ is expressed as:

$$D^{j,1}=<d_1^{j,1}, d_2^{j,1}, \ldots, d_n^{j,1}> \quad (15)$$

Since the model represented by equation (7) has a seasonal component, $d_i^{j,1} \in D^{j,1}$ describes an approximate degree of the actual observation and the model prediction of the pixel. Noise caused by C&CS will be located far from the fitting curve and have a large deviation, while the clean observation will be distributed near the fitting curve and have a small deviation.

FIG. 4B shows the results of the deviation computation. The deviation series removes the periodic component from the time series observation.

Step 315: Noise Identification;

Since the time series deviation has removed the seasonal component, the mean of the deviation will not change with time, i.e. a stationary series is in an ideal conditions. Thus, the clean observations will be distributed within a narrow range around the mean, whereas the noise will be located far from the fitting curve. Similar to traditional outlier detection methods, we can define noise as the observation values which are distributed outside the range of the mean $\mu$ plus or minus $\lambda$ standard deviations $\sigma$. Furthermore, $\lambda$ is a parameter set by users, and will enable us to detect noise.

Here, prior knowledge can be incorporated to perform noise detection, such as the NDVI of vegetation contaminated by noise is underestimated, then only the observations with a deviation less than $\mu-\lambda\sigma$ can be considered as noise.

FIG. 4B displays the noise detection result of the above method, and the noise is indicated with a cross mark.

Step 316: Iteration Process;

Since we used all the observation values including noise when performing the model fitting 313 during the first iteration, the obtained model might be biased. As shown in FIG. 4A, the fitting curve deviates far from the original observation values, which will hamper the deviation estimation. After removing the noise in the first iteration, the remaining observations as shown in FIG. 4C can be used to estimate a new model function. Since the noises have been eliminated for model fitting, it is expected that the new estimation will be more consistent with the actual profile. With this new function, we can recalculate the deviation more accurately. Ultimately, we can repeat steps 313, 314, and 315 to remove the outliers remaining in the clear observation until the number of iterations reaches the maximum number or no outlier is detected in one iteration.

The final model fitting results and outliers are shown in FIG. 4D. We can observe that the remaining observations are consistent with the actual values, and almost all the outliers have been removed.

Step 317: Mask Computation;

We convert the original TSVI back into the image space and obtain a noise mask, where each image has a noise mask whose pixels indicate that it is noise or a clean observation.

Step 318: Noise Optimization;

Since thresholds are not set properly or curves cannot be accurately fitted, spatial information can be incorporated into noise detection. Given that the clouds cover a large area, we can remove the small-sized clouds within the valid observations, or remove the small valid observations within the cloud, as long as they are smaller than a threshold $T_h$.

Figure 5:
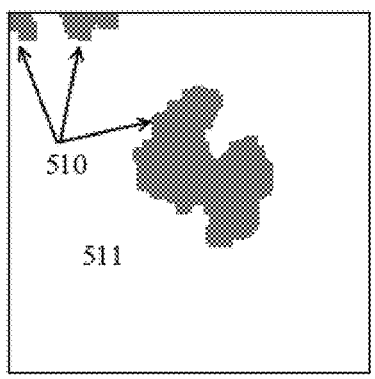
FIG. 5 is the noise detection result of partial time-series image of FIG. 1.
Figure 5:
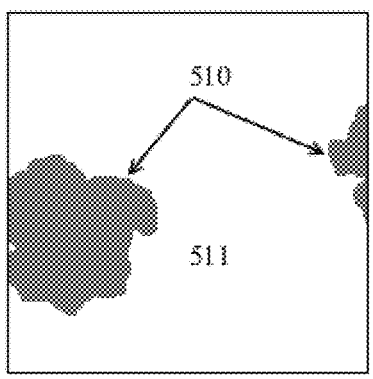
Figure 5:

FIG. 5 illustrates the results of the noise detection obtained by this embodiment. Gray areas in 511 represent noise masks that are missing or contaminated, and they are no longer used for subsequent applications or are filled by certain methods. White areas represent a clear observation that can be reliably used for land-related applications.

If our goal is to accurately obtain an accurate curve, steps 317 and 318 are optional.

Figure 6:
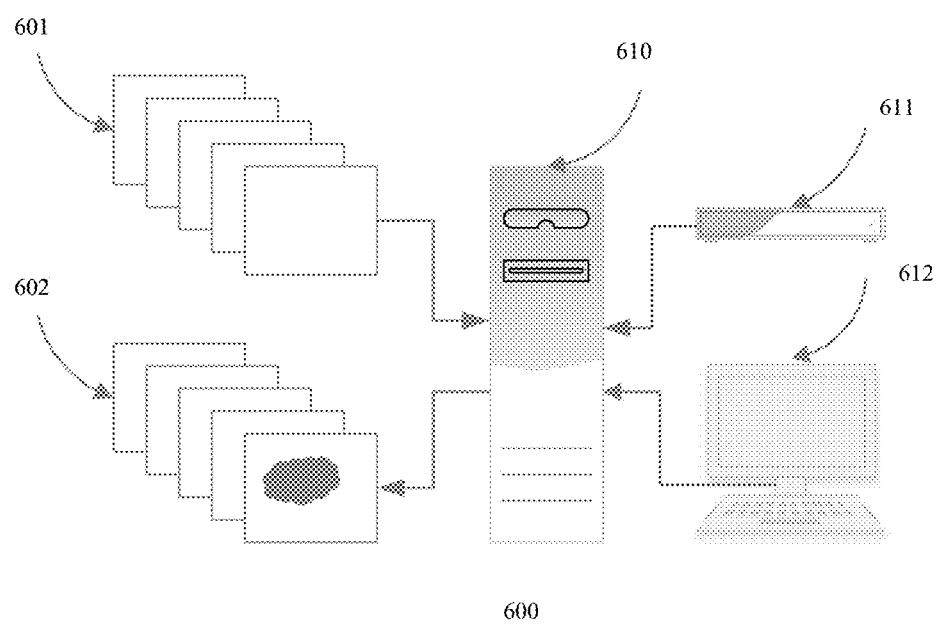
FIG. 6 is a representative system for implementing the noise detection described in the present invention.

FIG. 6 shows a computer system 600 that can implement our method. 601 is a time-series image that is stored in computer system 610, where portions of them are missing due to the contamination of C&CS, and their exact areas are unknown. Computer system 610 executes a series of programming instructions that perform noise detection on TSVI derived from the remote sensing image. The program, original time-series images, and intermediate results are stored in a storage medium 611 such as a hard disk or a remote storage server. The processing results or processing intermediate states can be visualized and have their parameters adjusted by computer display 612. Computer 600 receives time-series images from a computer storage medium, a camera memory card, or a communication network, and detects noise observations as described. 612 represents a video monitor or other displays, and the obtained image mask 602 is displayed to users on 612 using the above method. Additionally, the image-wise noise mask may be stored or transmitted to a remote location for analysis.

The content described in the embodiments of the present specification is merely an enumeration of the implementation forms of the inventive concept, and the protection scope of the present invention should not be construed as being limited to the specific forms stated in the embodiments. The protection scope of the present invention also includes equivalent technical means that those skilled in the art can think of in accordance with this inventive concept.

The invention claimed is:

1. A noise detection method for time-series vegetation index derived from remote sensing images, the method comprising the following steps:

computing the time-series vegetation index from n images I in a study area acquired at different acquisition dates where T, where I is expressed as $$I=<I_1,I_2,\ldots,I_n> \quad (1)$$

the acquisition date T of each image is expressed as $$T=<t_1,t_2,\ldots,t_n> \quad (2)$$

wherein, for the acquisition dates there is a relationship $t_{i-1} \leq t_i$, i=2,3,...,n, that is, $t_{i-1}$ is prior to $t_i$;

the time-series vegetation index $X^j$ extracted from time series images for pixel $(P^j)_{j=1}^m$ is expressed as:

$$X^j=<x_1^j,x_2^j,\ldots,x_n^j> \quad (3)$$

where m pixels P in the study area are expressed as:

$$P=\{P^1,P^2,\ldots,P^m\}^T \quad (4)$$

wherein the time-series vegetation index use a normalized difference vegetation index NDVI, an enhanced vegetation index EVI or other vegetation index, the time-series vegetation index eliminates the radiation background of the surface and highlights the vegetation characteristics;

determining temporal variations of the time-series vegetation index for each pixel, and classifying the temporal variations into a stationary series set S or a non-stationary series set NS, while S and NS satisfy:

$$S \cap NS = \emptyset \quad (5)$$

$$S \cup NS = P \quad (6)$$

where the stationary series refers to a series in which a mean value and standard deviation do not change with time, and the non-stationary series refers to a series in which the mean value and standard deviation change with time;

for pixels in the non-stationary series set NS, using a composite Gaussian model to fit a discrete time-series vegetation index, wherein in the fitting process, T is the independent variable, X is the dependent variable, $\hat{X}$ is the fitting result, and the Gaussian model is expressed as:

$$\hat{X} = f(T) = \sum_{k=1}^{K} a_k e^{-\frac{(t-\mu_k)^2}{2(\sigma_k)^2}} \quad (7)$$

where $\alpha_k$, $\mu_k$ and $\sigma_k$ are parameters to be estimated, which describe the Gaussian model;

$\alpha_k$ represents the proportion of a Gaussian component k, that is, a proportion of the current component in the total components; K represents the component number in the Gaussian model, that is, a number of peak-and-valley combinations contained by a curve; $\mu_k$ represents a mean value, and when t equals $\mu_k$, the current Gaussian component reaches the maximum value; $\sigma_k$ determines the steepness of the peak;

for the pixel $P^j \in NS$, when $t_i \in T$, the value $\hat{x}_i^{j,1}$ calculated by the Gaussian model and an actual observed value $x_i^{j,1}$ has been obtained, computing a deviation $d_i^{j,1}$ as:

$$d_i^{j,1} = \hat{x}_i^{j,1} - x_i^{j,1} \quad (8)$$

where its superscript 1 indicates the result of a first iteration $d_i^{j,1}$ indicates closeness of the value $\hat{x}_i^{j,1}$ to the actual observed value $x_i^{j,1}$; the larger the $|d_i^{j,1}|$ is, the greater the difference between the two values is, and therefore the worse the fitting result will be; the smaller $|d_i^{j,1}|$ is, the closer the two values are, and therefore the better the fitting result will be;

wherein for the pixel $P^j \in P$ where $t_i \in T$, the result of deviation computation from the first iteration is expressed as:

$$D^{j,1} = <d_1^{j,1}, d_2^{j,1}, \ldots, d_n^{j,1}> \quad (9)$$

where as the deviation $D^{j,1}$ removes seasonal components, the non-stationary series is converted into a stationary series;

for the converted deviation series $D^{j-1}$ and stationary series S, performing noise detection based on an assumption that the observed values $x_i^{j,1}$ are distributed within a certain range around the mean;

wherein for $P^j \in S$, the original series $X^j$ is used for noise detection; whereas for $P^j \in NS$, the deviation series $D^{j,1}$ is used, where the original series $X^j$ and the deviation series $D^{j,1}$ are written as $s^j$ uniformly:

$$s^j = <s_1^j, s_2^j, \ldots s_n^j> \quad (10)$$

and $$m_i^j = \begin{cases} 1 & s_i^j \geq [\mu(s^j) - \lambda\sigma(s^j)] \text{ and } s_i^j \leq [\mu(s^j) + \lambda\sigma(s^j)] \\ 0 & \text{otherwise} \end{cases} \quad (11)$$

where $m_i^j$ is mask data, indicating whether the pixel $P^j \in P$ at $t_i \in T$ is a valid observation as indicated by 1, or is noise as indicated by 0; $\mu(s^j)$ represents a mean of $s^j$, $\sigma(s^j)$ represents a standard deviation of $s^j$, and $\lambda$ represents a multiple of the standard deviation; wherein an observation value, whose distance from the fitting curve is distributed within the range of the mean value plus or minus $\lambda$ standard deviations, is taken as a valid observation, while an observation value distributed outside of that range is taken as noise;

through the above process, obtaining the mask $M^j$ of the pixel $P^j \in P$, the mask $M^j$ being expressed as:

$$M^j = <m_1^j, m_2^j, \ldots, m_n^j> \quad (12)$$

for the remaining observation values after noise removal, that is, excluding the observation with $m_i^j = 0$, the step of non-stationary series fitting, the step of deviation computation, and the step of noise detection until the iteration reaches the maximum number or no noise is detected in one iteration;

converting the mask data of each pixel $P^j \in P$ back to the image space to obtain the noise mask M, which is expressed as:

$$M = <M_1, M_2, \ldots, M_n> \quad (13)$$

where $M_i \in M$ indicates whether each observation in the image $I_i \in I$ is a valid observation value or not, in subsequent applications, thereby eliminating the noise to obtain accurate application results;

optimizing the noise according to mathematical morphology method to obtain a smooth mask result.

* * * * *